United States Patent [19]

Robertson

[11] 3,950,010
[45] Apr. 13, 1976

[54] TIE-DOWN CLAMP ASSEMBLY FOR TRUCK VEHICLE BED
[75] Inventor: Robert H. Robertson, Dallas, Tex.
[73] Assignee: Ronbil Industries, Inc., Mesquite, Tex.
[22] Filed: Jan. 29, 1975
[21] Appl. No.: 545,086

[52] U.S. Cl. .............................. 280/179 R; 105/475
[51] Int. Cl.² ........................................... B60P 7/00
[58] Field of Search..... 280/179 A, 179 R; 105/475, 105/481, 483

[56] References Cited
UNITED STATES PATENTS

| | | | |
|---|---|---|---|
| 2,688,289 | 8/1954 | Sterling | 280/179 R X |
| 3,241,501 | 3/1966 | Watts | 280/179 R X |
| 3,351,356 | 11/1967 | Clark et al. | 280/179 R |
| 3,840,250 | 10/1974 | Bott | 280/179 R |
| 3,841,660 | 10/1974 | Clark | 280/179 R |

Primary Examiner—M. H. Wood, Jr.
Assistant Examiner—Michael J. Forman
Attorney, Agent, or Firm—Richards, Harris & Medlock

[57] ABSTRACT

The specification discloses a clamp assembly for attachment to a truck vehicle bed having rectangular openings therein. A rectangular housing is dimensioned to be received within the vehicle bed opening. Flanges are attached to the housing to position the housing within the opening. A rigid elongate member is slidably received in an aperture formed in the top of the housing. A lock plate that is longer than the width of the opening is attached to the lower end of the elongate member and is rotatable within the housing between first and second positions. In the first position, the lock plate is aligned with the housing. In the second position, the lock plate is oriented across the width of the housing to prevent withdrawal of the housing from the opening. Inclined slots are formed in the sides of the housing to accommodate the lock plate during rotation between the first and second positions and in order to cam the lock plate upwardly during rotation into the second position. A nut on the elongate member may be tightened in order to maintain the lock plate in the second position to lock the housing in the opening.

11 Claims, 5 Drawing Figures

TIE-DOWN CLAMP ASSEMBLY FOR TRUCK VEHICLE BED

FIELD OF THE INVENTION

This invention relates to clamp assemblies, and more particularly relates to a tie-down clamp assembly for attachment in openings in a truck vehicle bed.

THE PRIOR ART

Pickup trucks commonly have flat beds with vertically extending sidewalls. On many pickups, rectangular openings are formed in the upper portion of the bed sidewalls for reception of stakes to enable cargo carried by the pickup to be tied down. Devices have been heretofore proposed for clamping within the openings in pickup bed sidewalls to serve as tie-down devices for attaching to cargo carried in the pickup truck bed.

One type of previously developed device has utilized an expandable rubber body which is inserted into the openings in an unexpanded position and then is expanded to prevent its removal. However, such devices have not been completely satisfactory inasmuch as they tend to loosen and may be pulled out under the application of extreme forces. Another type of previously developed tie-down device is disclosed in U.S. Pat. No. 3,351,356, issued Nov. 7, 1967 and entitled "Truck Tie-Down Device." This type of device utilizes a lock plate member which must be accurately oriented relative to an opening in the truck sidewall prior to tightening. However, in practice it has been found difficult to always properly orient the lock plate, thereby presenting problems in installation. Moreover, in certain embodiments of the tie-down device disclosed in U.S. Pat. No. 3,351,356, apertures have been required to be drilled in the truck sidewalls.

SUMMARY OF THE INVENTION

The present invention comprises a tie-down clamp assembly which is extremely simple to install and which always provides excellent locking of the device within the apertures. In accordance with the present invention, a clamp assembly for attachment within an opening formed in a surface includes a housing shaped to be fitted into the opening. A flange is attached to the housing and has dimensions greater than the opening so as to abut with the surface to position the housing in the opening. A rigid elongate member is slidably received in the housing and projects normally to the surface when the housing is mounted in the opening. A lock plate longer than the width of the opening is attached to one end of the elongate member and is rotatable within the housing between first and second positions upon rotation of the elongate member. The first position orients the plate relative to the housing to enable the housing to pass through the opening and the second position orients the length of the plate across the width of the opening to prevent withdrawal of the housing from the opening. Structure on the housing stops the plate at the second position upon rotation of the elongate member. A nut is threadedly attached to the other end of the elongate member for being tightened to maintain the plate in the second position to lock the clamp assembly in the opening.

In accordance with yet another aspect of the invention, a tie-down clamp assembly is provided for attachment to a truck vehicle bed having rectangular openings therein. A rectangular housing is dimensioned to be received within one of the openings in the vehicle bed. Structure is attached to the housing to abut within the opening. An aperture is formed in the top of the housing. An elongate member is slidably received in the aperture. A lock plate longer than the width of the opening is attached to the lower end of the elongate member and is rotatable within the housing between first and second positions upon rotation of the elongate member. The first position aligns the lock plate with the housing to enable the housing to pass through the opening and the second position orients the length of the lock plate across the width of the housing to prevent withdrawal of the housing from the opening. Inclined slots are formed in the sides of the housing to accommodate the lock plate during rotation thereof to the second position and for camming the lock plate upwardly. A nut threadedly received by the elongate member maintains the lock plate in the second position to lock the housing in the opening.

In accordance with yet another aspect of the invention, a tie-down clamp assembly includes a housing having a rectangular top and downwardly depending sidewalls. Upwardly inclined slots extend in the sidewalls in opposing directions. An aperture is formed in the rectangular top. A rigid elongate member is slidably received in the aperture. A lock plate has a length longer than the width of the housing and is connected to the lower end of the elongate member and received within the housing below the top of the housing. The elongate member may be rotated such that the ends of the lock plate are received in the inclined slots and are cammed upwardly toward the rectangular top.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
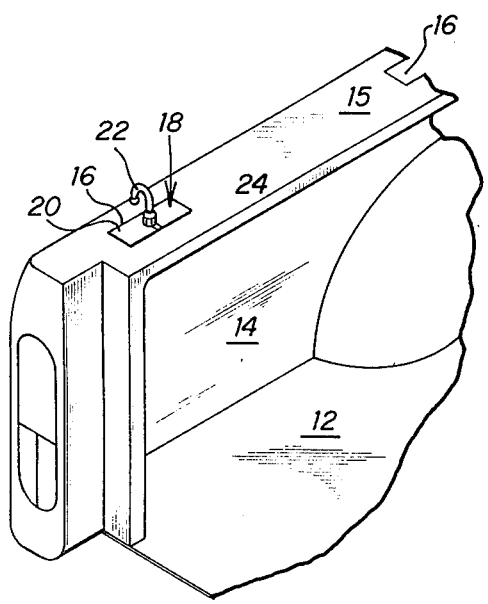
FIG. 1 is a perspective view of a typical pickup bed illustrating attachment of the tie-down clamp assembly of the present invention.

Referring to FIG. 1, a pickup bed is generally designated by the numeral 10 and includes a horizontal bed portion 12 and an upwardly extending sidewall 14 having a top surface 15. Rectangular openings 16 are formed along the top surface 15 of the sidewall 14 in the well known manner. In one of the openings 16, a tie-down clamp assembly 18 in accordance with the present invention has been installed. Clamp assembly 18 includes a base portion 20 which supports a hook 22. A nut 24 is threadedly received by the hook 22 and is tightened against the base portion 20 in the manner to be subsequently described. The hook 22 may be attached to a rope or the like in order to tie down cargo within the pickup bed in the well known manner. If desired, a ring or the like may be substituted for hook 22.

Figure 2:
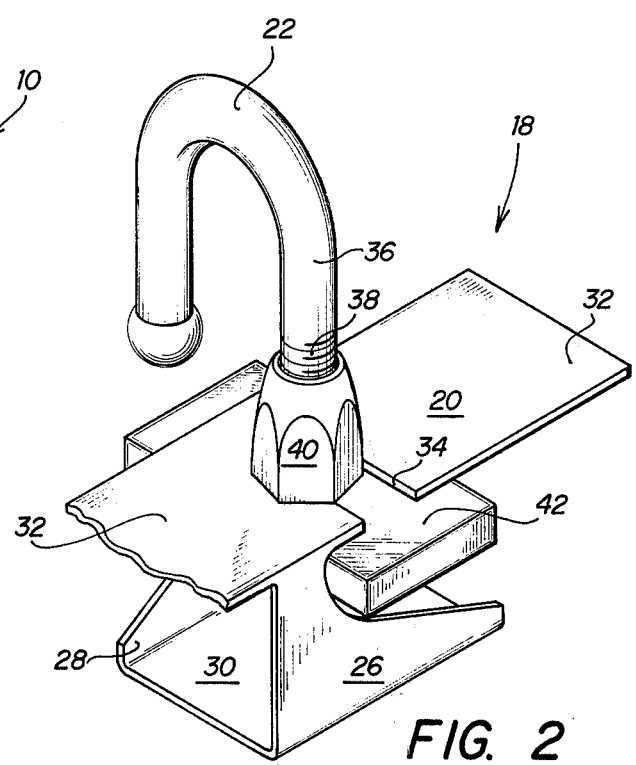
FIG. 2 is a perspective view, partially broken away, of the clamp assembly of the present invention shown in the locked position.

FIG. 2 illustrates a perspective view of the clamp assembly 18 according to the invention. The base portion 20 serves as a top for a rectangular housing formed by downwardly extending sidewalls 26 and 28 and including a bottom 30. Base portion 20 also includes horizontally extending flange portions 32 which are longer than the length of the opening 16 in the pickup bed sidewall to position the housing within the opening 16 to the desired depth.

A slot 34 is formed through the base portion 20 and communicates with a central aperture in the base portion 20 which receives the elongate member 36. It will be understood that elongate member 36 may comprise a straight bolt, but in the preferred embodiment, the elongate member 36 includes a hook 22 at the upper end thereof to serve as a tie-down element. Threaded portion 38 is formed on the elongate member 36 to threadedly receive a nut 40. The end of the elongate member 36 is fixedly attached to a lock plate 42. Lock plate 42 has a length greater than the width of opening 16.

Figure 3:
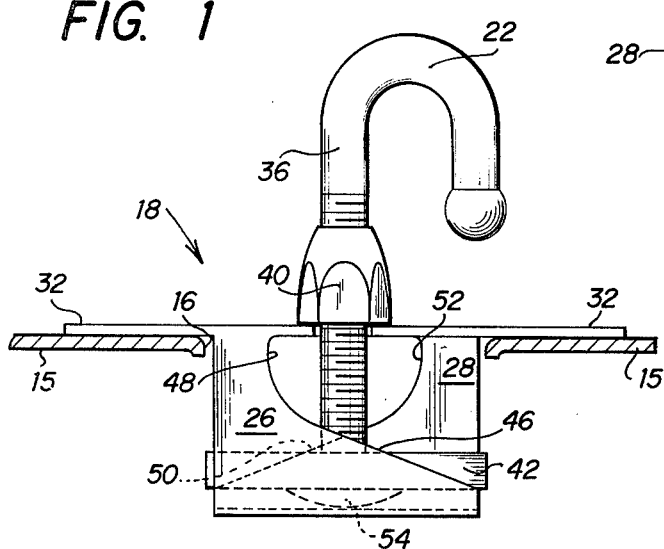
FIG. 3 is a side view of the present clamp assembly shown inserted into a pickup bed opening and positioned in the unlocked position.

Referring to FIG. 3, upwardly inclined slots are formed in the sidewalls 26 and 28 of the housing. The slot in sidewall 26 is formed by an inclined surface 46 which terminates in an abutment surface 48. The slot formed in the sidewall 28 is formed by an inclined surface 50 which terminates in an abutment surface 52. As shown in FIG. 3, lock plate 42 is attached to the end of the elongate member 36 by welding or the like. The lower end of the elongate member 36 may be provided with a bolt head 54. If desired, elongate member 36 and plate 42 may be fabricated as an integral device. The bottom 30 of the clamp assembly prevents the latch plate 42 from falling from the housing if the nut 40 is removed from the member 36.

FIG. 3 illustrates the clamp assembly in the unlocked position wherein the lock plate 42 has its length aligned with the length of the housing. The length of the lock plate 42 and the housing is less than the length of the opening 16 formed in the surface 15 of the pickup bed sidewall. Thus, the housing may be dropped into the opening, and the flanges 32 will abut against the surface 15 to properly position the housing within the opening 16. In the unlocked position, the nut 40 is spaced a substantial distance from the lock plate 42. When it is desired to lock the clamp assembly within the opening 16, the elongate member 36 is rotated in a clockwise direction. This causes the lock plate 42 to be rotated within the slots formed in the sidewalls 26 and 28. This causes the ends of the lock plate 42 to engage surfaces 46 and 50 and thus be cammed upwardly. The lock plate 42 is cammed upwardly until the lock plate 42 abuts the abutment surfaces 48 and 52.

Figure 4:
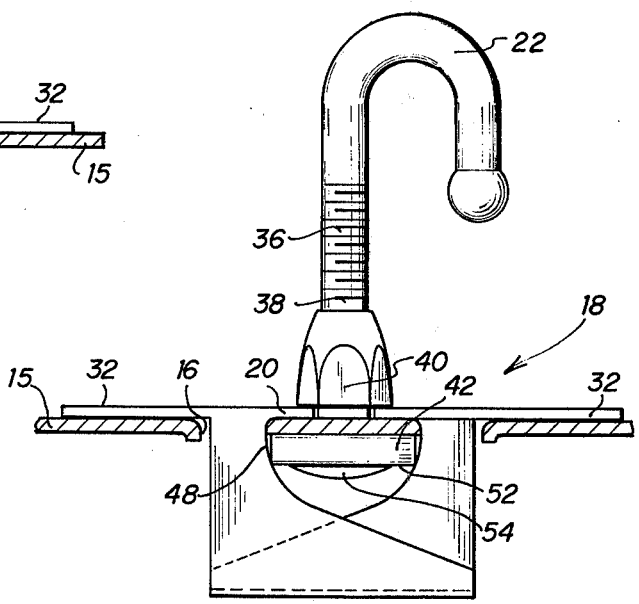
FIG. 4 is the device shown in FIG. 3 shown in the locked position.

At this point, the lock plate 42 is properly positioned transversely to the opening 16. Inasmuch as the length of the lock plate 42 is greater than the width of the opening 16, the lock plate 42 will prevent withdrawal of the clamp assembly. The nut 40 is then tightened against the base portion 20 in the manner shown in FIG. 4. In this position, the clamp assembly is firmly locked within the opening 16 and may be used as a tiedown device. If it is desired to later remove the device, then the nut 40 need only be loosened, thereby allowing the lock plate 42 to rotate counterclockwise to the lower position of the housing as shown in FIG. 3, at which time the entire clamp assembly may be removed from the opening 16. In an alternate embodiment, nut 40 may be made integral with the hook 22, and the nut 40 would then be tightened on a standard bolt attached to lock plate 42.

Figure 5:
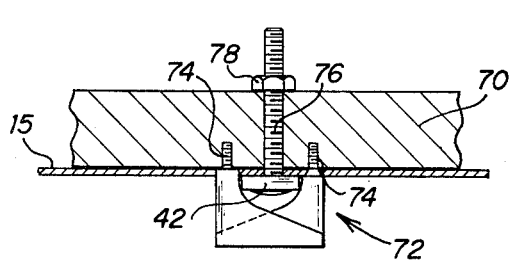
FIG. 5 is a view of a second embodiment of the present invention illustrated in the locked position.

FIG. 5 illustrates an alternative embodiment of the present invention, wherein a bar 70 or the like may be utilized in lieu of the flanges 32. The clamp assembly 72 shown in FIG. 5 is identical to the clamp assembly previously described, with the exception that flanges 32 are omitted. In their place, the bar 70 is provided and is rigidly attached by means of screws 74 to the top of the clamp assembly 72. Also in FIG. 5, a bolt 76 is utilized in place of the hook 22. The bolt 76 may be rotated in order to position the lock plate 42 in the illustrated position. The nut 78 may then be tightened against the bar 70 in order to rigidly lock the bar 72 to the surface 15. Bar 72 may in turn be connected to a camper topper or to any other desired structure.

While the present invention has been particularly described with respect to being clamped to openings in pickup beds, it will be understood that the present clamp assembly is useful for clamping within openings formed in any surface. Due to the provision of the abutment surfaces 48 and 52, the lock plate 42 is always perfectly aligned transversely to the opening, thereby providing ease of installation while yet providing extremely good clamping characteristics.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:
1. A tie down clamp assembly comprising:
   a housing having a rectangular top and downwardly depending side walls,
   means for positioning said housing in a predetermined position within an opening,
   upwardly inclined slots extending in said side walls in opposing directions,
   an aperture formed in said rectangular top,
   a rigid elongate member slidably received in said aperture,
   a lock plate having a length longer than the width of said housing connected to the lower end of said elongate member and received within said housing below said top of said housing,
   and means for rotating said elongate member such that the ends of said lock plate are received in said inclined slots and cammed upwardly toward said rectangular top to be positioned transverse to the opening, and
   abutment means for positioning said lock plate transversely to said housing.

2. The clamp assembly of claim 1 and further comprising a nut threadedly engaging the upper end portion of said elongate member.

3. The clamp assembly of claim 1 and further comprising a bottom portion extending between said sidewalls for maintaining said lock plate within said housing.

4. A clamp assembly for attachment within an opening formed in a surface comprising:
   a housing shaped to be fitted into said opening,
   means for maintaining said housing in a predetermined position relative to said surface within said opening, a rigid elongate member slidably received in said housing and projecting normally to said surface when said housing is mounted in said opening, opposing cutout portions in the sides of said housing, a lock plate longer than the width of said opening being attached to one end of said elongate member and rotatable within said housing between first and second positions upon rotation of said elongate member, said first position orienting said plate relative to said housing to enable said housing to pass through said opening and said second position orienting the ends of said plate through said cutout portions and the length of said plate across the width of said opening to prevent withdrawal of said housing from said opening, said cutout portions being configured to accommodate movement of said plate toward said opening during rotation of said plate from said first position to said second position.

5. A clamp assembly for attachment within an opening formed in a surface comprising:

a housing shaped to be fitted into said opening, flange means attached to said housing and having dimensions greater than said opening so as to abut with said surface to position said housing in said opening, a rigid elongate member slidably received in said housing and projecting normally to said surface when said housing is mounted in said opening, cutout portions in the sides of said housing including sloping grooves terminating in abutment surfaces, a lock plate longer than the width of said opening being attached to one end of said elongate member and rotatable within said housing between first and second positions upon rotation of said elongate member, said first position orienting said plate relative to said housing to enable said housing to pass through said opening and said second position orienting the ends of said plate through said cutout portions and the length of said plate across the width of said opening to prevent withdrawal of said housing from said opening, said abutment surfaces stopping said plate at said second position upon rotation of said elongate member, and means for maintaining said plate in said second position to lock said clamp assembly in said opening.

6. A tie down clamp assembly for attachment to a truck vehicle bed having rectangular openings therein comprising:

a rectangular housing dimensioned to be received within one of said openings in the vehicle bed, means attached to said housing to abut with the upper surface of said vehicle bed to position said housing within said opening, an aperture formed in the top of said housing, a rigid elongate member slidably received in said aperture, a lock plate longer than the width of said opening attached to the lower end of said elongate member and rotatable within said housing between first and second positions upon rotation of said elongate member, said first position aligning said lock plate with said housing to enable said housing to pass through said opening and said second position orienting the length of said lock plate across the width of the housing to prevent withdrawal of said housing from said opening, inclined slots formed in the sides of said housing to accommodate said lock plate during rotation thereof to said second position and for camming said lock plate upwardly, and means on said elongate member for maintaining said lock plate in said second position to lock said housing in said opening.

7. The clamp assembly of claim 6 wherein said inclined slots on opposite sides of said housing extend in opposite directions.

8. The clamp assembly of claim 6 wherein said inclined slots include abutment surfaces to locate said lock plate at the desired second position.

9. The clamp assembly of claim 6 wherein said elongate member comprises a threaded bolt and wherein said means on said elongate member comprises a nut.

10. The clamp assembly of claim 6 and further comprising a slot in the top of said housing which communicates with said aperture to enable insertion of said elongate member in said aperture.

11. The clamp assembly of claim 6 and further comprising a hook formed on the upper end of said elongate member.

* * * * *

UNITED STATES PATENT OFFICE
CERTIFICATE OF CORRECTION

Patent No. 3,950,010                 Dated   April 13, 1976

Inventor(s) Robert H. Robertson

It is certified that error appears in the above-identified patent and that said Letters Patent are hereby corrected as shown below:

Col. 2, line 2, immediately following the phrase "to abut" insert --with the upper surface of the vehicle bed to position the housing--.

Signed and Sealed this

Thirteenth Day of July 1976

[SEAL]

Attest:

RUTH C. MASON
Attesting Officer

C. MARSHALL DANN
Commissioner of Patents and Trademarks